April 18, 1961 L. BOWSHER 2,979,855
MINNOW TRAP
Filed July 7, 1958 2 Sheets-Sheet 1
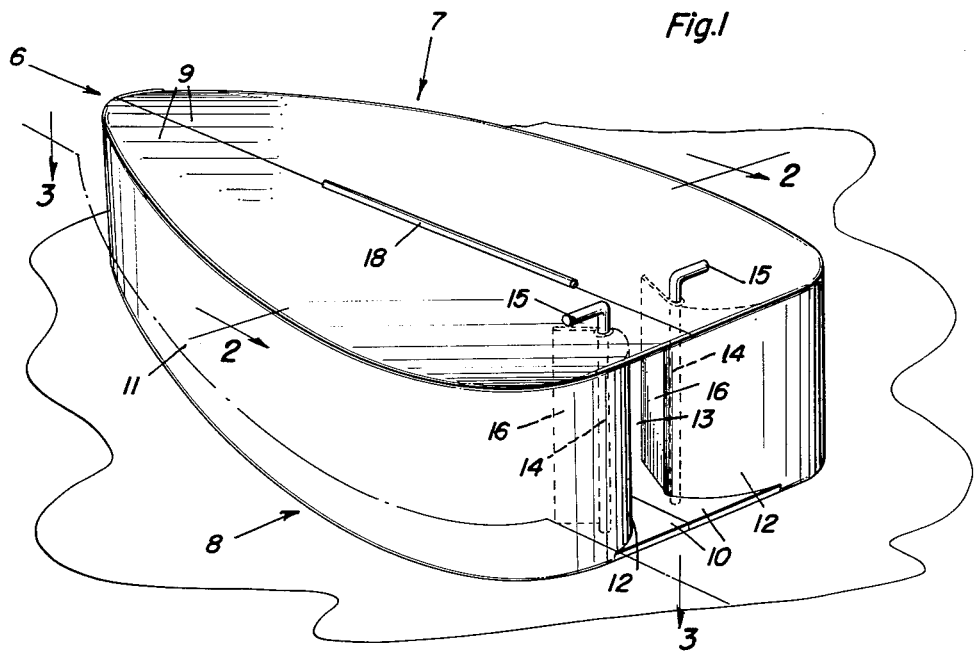
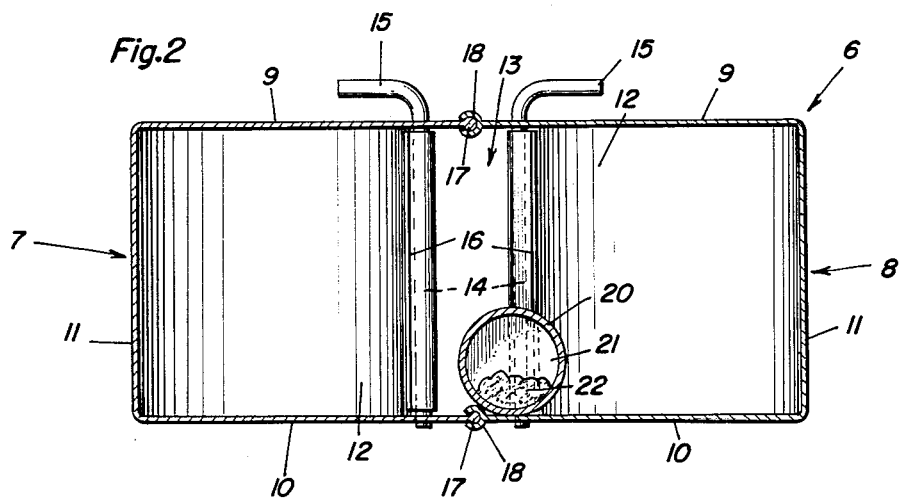
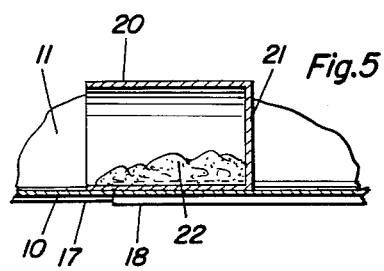
Lewis Bowsher
INVENTOR.
BY *Clarence A. O'Brien*
*and Harvey B. Jackson*
Attorneys

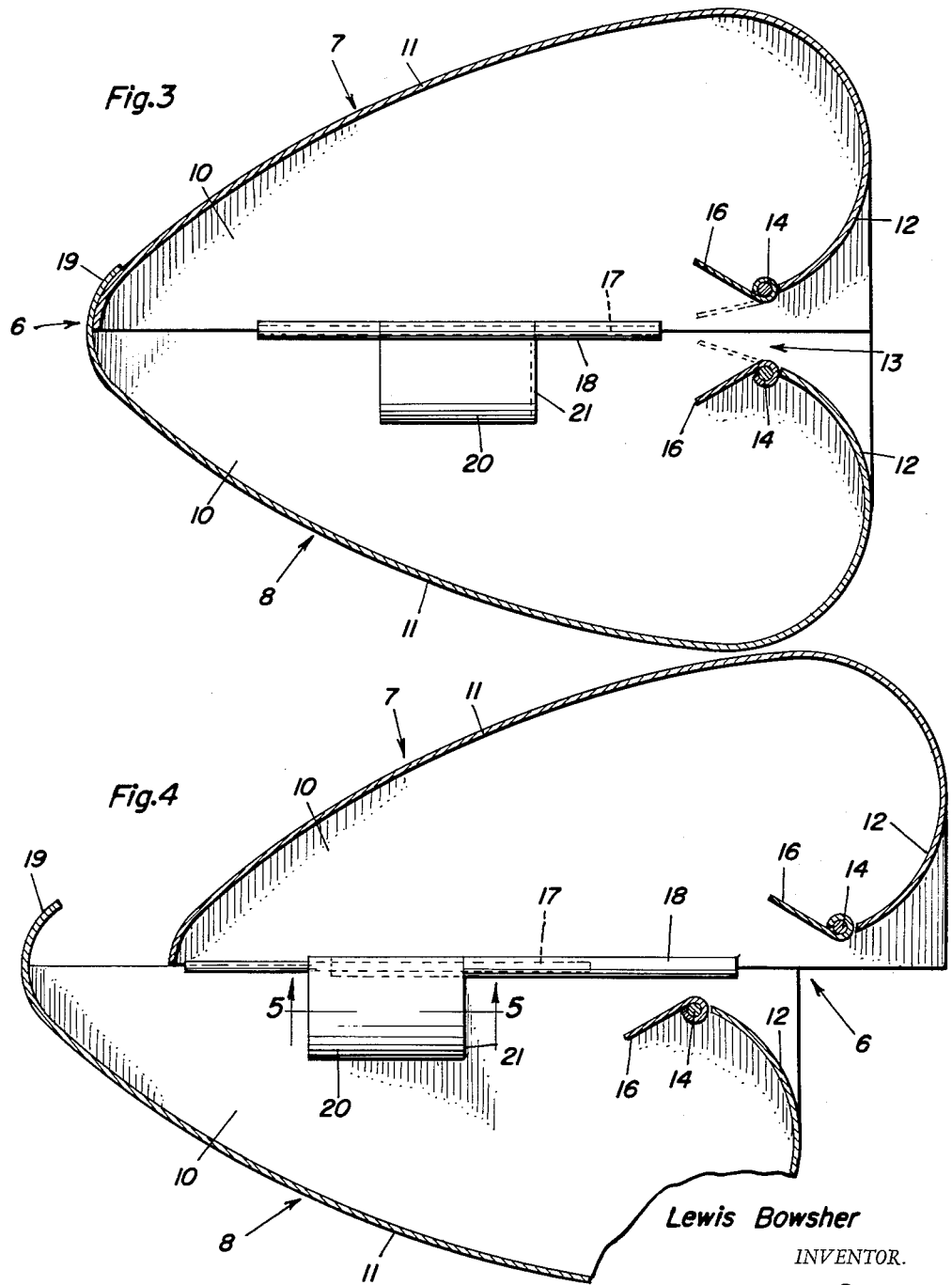

United States Patent Office 2,979,855
Patented Apr. 18, 1961

2,979,855

MINNOW TRAP

Lewis Bowsher, Buffalo, Ind.

Filed July 7, 1958, Ser. No. 746,750

3 Claims. (Cl. 43—100)

This invention relates to new and useful improvements in minnow traps for use particularly in streams and has for one of its important objects to provide, in a manner as hereinafter set forth, a trap of the character described comprising a novel shape whereby said trap will be kept in the flow of the stream by the current.

Another very important object of the present invention is to provide a trap of the aforementioned character comprising novel access means for baiting, removing the minnows, etc.

Other objects of the invention are to provide a minnow trap of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a minnow trap constructed in accordance with the present invention;

Figure 2 is a view in transverse section through the trap taken substantially on the line 2—2 of Figure 1;

Figure 3 is a horizontal sectional view taken substantially on the line 3—3 of Figure 1;

Figure 4 is a horizontal sectional view substantially similar to Figure 3 but showing the trap open; and Figure 5 is a fragmentary view in longitudinal section, taken substantially on the line 5—5 of Figure 4.

Referring now to the drawing in detail, it will be seen that the embodiment of the invention which has been illustrated comprises a substantially heart-shaped chamber or receptacle of plastic or other suitable material which is designated generally by reference character 6. The receptacle 6 is split longitudinally from end to end in a manner to provide a pair of opposed, slidably connected, complemental half sections 7 and 8.

The receptacle 6 further includes a top 9, a bottom 10 and vertical walls 11. The walls 11 comprise inwardly and reversely curved forward end portions 12 which terminate in spaced relation to each other in a manner to provide a vertically elongated, restricted or narrow entrance 13.

Journalled in the top and bottom 9 and 10, respectively, of the receptacle 6, at the forward ends of the walls 11 and on opposite sides of the entrance 13 are vertical rods or shafts 14 which terminate in angularly bent upper end portions providing operating handles 15. Fixed on the rods 14 and extending rearwardly therefrom in the receptacle 6 are coacting gates 16 which regulate the width of the entrance 13 or which, if desired, close said entrance.

As shown to advantage in Figure 2 of the drawing, the longitudinal inner edges of the top and bottom portions 9 and 10 of the half section 7 have formed thereon beads or ribs 17. The corresponding edges of the section 8 have formed thereon substantially C-shaped guides 18 which are slidable on the beads 17. Thus, the sections 7 and 8 are connected for relative longitudinal sliding movement. The vertical wall 11 of the section 8 is provided on its rear end with an extension 19 which is engageable with the rear end portion of the section 7 for limiting the forward sliding movement of said section 8 on said section 7.

Fixed longitudinally in the inner portion of the section 8 on the bottom 10 thereof and at an intermediate point therein is a substantially cylindrical bait holder 20. The bait holder 20 is closed at its forward end, as indicated at 21, and open at its rear end. Reference character 22 designates bait in the holder 20.

It is thought that the use or operation of the trap will be readily apparent from a consideration of the foregoing. Briefly, the sections 7 and 8 are slid relative to each other as shown in Figure 4 of the drawing to permit the bait 22 to be inserted in the holder 20, after which said sections are returned to closed position. The trap, when positioned in the water, is preferably headed upstream. With the gates 16 open, as shown, the minnows enter the receptacle 6 at the entrance 13, being attracted by the bait in the holder 20. By adjusting the swinging gates 16 toward or away from each other through the medium of the handles 15 the width of the opening 13 may be regulated as desired for controlling the size of the minows entering the trap. To remove the minnows from the trap the sections 7 and 8 are again slid to the position of Figure 4 of the drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A minnow trap including: a substantially heart-shaped receptacle having a centrally located entrance in its forward end, said receptacle being longitudinally split from end to end and including a pair of complemental, separable half-sections, and means for connecting said half sections for longitudinal sliding movement relative to each other whereby access openings to said half-sections may be provided at the opposite ends of the receptacle for removing minnows from said half-sections, said means including longitudinal beads on one of the half sections, and guides of substantially C-shaped transverse section on the other of said half sections slidable on said beads.

2. A minnow trap comprising: a flat, substantially heart-shaped receptacle having a centrally located entrance in its forward end, means for regulating the size of the entrance, said receptacle being longitudinally split from end to end and including a pair of complemental, separable half-sections, longitudinal beads on one of the half sections, guides of substantially C-shaped transverse section on the other of said half sections operable on the beads for longitudinally slidably adjustably connecting said half section whereby access openings to said half-sections may be provided at the opposite ends of the receptacle for removing minnows from said half-sections, and means on said other half section engageable with said one half section for limiting the forward sliding movement of said other half section relative to said one half section.

3. A minnow trap comprising a substantially flat, heart-shaped receptacle including a top, a bottom and vertical walls, said vertical walls including inwardly and reversely curved forward end portions terminating in transversely spaced relation to each other and defining an entrance opening for minnows, said receptacle being split from end to end on its longitudinal center with the split traversing the entrance opening and providing a pair of complemental half-sections, and means slidably connecting the half-sections whereby they may be longitudinally adjusted relative to each other for enlarging the entrance opening and providing an opening at the rear end of the receptacle for access to said half-sections for removing the minnows therefrom.

References Cited in the file of this patent

UNITED STATES PATENTS

| | | |
|---|---|---|
| 993,238 | Gates | May 23, 1911 |
| 1,237,399 | Sloan | Aug. 21, 1917 |
| 1,286,661 | Langdale | Dec. 3, 1918 |
| 2,389,436 | Mason | Apr. 16, 1946 |
| 2,491,524 | Siple | Dec. 20, 1949 |
| 2,529,589 | Biery | Nov. 14, 1950 |

FOREIGN PATENTS

| | | |
|---|---|---|
| 32,122 | Norway | Apr. 11, 1921 |